United States Patent [19]

Stengrim

[11] Patent Number: 5,746,364

[45] Date of Patent: May 5, 1998

[54] PORTABLE CARRIER FOR OFF-ROAD VEHICLES

[76] Inventor: Jon D. Stengrim, P.O. Box 1503, Palmer, Ak. 99645

[21] Appl. No.: 712,084

[22] Filed: Sep. 11, 1996

[51] Int. Cl.⁶ .................. B60R 9/00; B60R 9/06
[52] U.S. Cl. .................. 224/572; 224/408; 224/547; 224/563; 224/568; 224/534; 224/537; 224/571; 224/526; 224/42.33
[58] Field of Search .................. 224/408, 572, 224/568, 563, 526, 527, 534, 537, 571, 42.32, 42.33, 547; 206/523

[56] References Cited

U.S. PATENT DOCUMENTS

| | | | |
|---|---|---|---|
| 1,860,204 | 5/1932 | Roberts | 224/42.32 |
| 2,706,036 | 4/1955 | Neal | 206/523 |
| 3,036,749 | 5/1962 | Evans | 224/42.32 |
| 3,687,344 | 8/1972 | Nixon | 224/527 |
| 4,185,673 | 1/1980 | Daniello | 206/523 |
| 4,258,869 | 3/1981 | Hilgendorff | 224/408 |
| 4,964,529 | 10/1990 | Houston | 206/523 |
| 5,605,112 | 2/1997 | Schuman | 224/572 |

*Primary Examiner*—Linda J. Sholl
*Attorney, Agent, or Firm*—Michael Tavella

[57] ABSTRACT

A gas can carrier that attaches to the back of snow machines and off road vehicles. The carrier has an inner foam core that is covered with heavy duty pack cloth. A number of pockets are supplied for convenience. The top center portion of the carrier is hollowed out forming a recessed area to receive a spare gas can. An expandable pocket is also formed in the recess so that if no gas can is being carried, items can be kept within this central pocket. To hold the carrier on a snow machine or other vehicle, a set of straps is provided that loop around the vehicle's bumpers.

17 Claims, 7 Drawing Sheets

PORTABLE CARRIER FOR OFF-ROAD VEHICLES

This invention relates to portable carriers for off-road vehicles and particularly to portable carriers for off-road vehicles having convertible space for hauling a variety of items.

BACKGROUND OF THE INVENTION

Snow machines, four-wheel, and six-wheel vehicles are growing increasingly popular for off-road, back country travel. Such vehicles have a wide range and can travel far from needed supplies, even on short trips. As a result, many riders like to carry extra gas, food and other supplies. Most often, especially on snow machines, it is difficult to carry such supplies without an extra sled. Only a few carriers have been developed for snow machines. Examples of these devices are found in U.S. Pat. No. 3,687,344 to Nixon, that teaches a brace member and a cargo box for the rear of the sled. The drawings indicate that this cargo box has solid walls and apparently not intended for carrying extra gas supplies. U.S. Pat. No. 3,921,870 to Camp discloses a small basket that is attached to the seat back of older style snow machines. Although useful, it is an unprotected basket that is loosely secured to the machine. It does not appear large enough to carry an extra gas supply and does not appear to offer much protection to items stored in the basket.

Current snowmachines often use a hard rack mounted at the back of their machines. Hard racks are not preferred by aggressive riders as they ride their machines very hard, causing problems with the hard rack. Moreover, hard racks are heavy and difficult to remove from the snow machine.

SUMMARY OF THE INVENTION

All the difficulties in the above inventions are overcome. The invention is a gas carrier that attaches to the back of snow machines and off road vehicles. The carrier has an inner foam core that is covered with heavy duty pack cloth. A number of pockets are provided for convenience. The top center portion of the carrier is hollowed out forming a recessed are to receive a spare gas can. An expandable pocket is also formed in the recess so that if no gas can is being carried, items can be kept within this central pocket. To hold the carrier on a snow machine or other vehicle a set of straps is provided that loop around the vehicle's bumpers. The instant invention provides a light weight alternative to the hard racks. The instant invention is also easier to put on and take off the machines as well.

It is an object of this invention to produce a carrier for off road vehicles that is able to carry a gas can safely.

It is further object of this invention to produce a carrier for off road vehicles that has a central storage pocket for use when no gas can is being carried.

It is another object of this invention to produce a carrier for off road vehicles that can be quickly and securely fastened to an off road vehicle.

It is yet another object of this invention to produce a carrier for off road vehicles that has at least one additional storage pocket.

It is a further object of this invention to produce a carrier for off road vehicles that has a rear light attachment for use when an off road vehicle's rear light is obscured by the carrier.

DETAILED DESCRIPTION OF THE INVENTION

Figure 1:
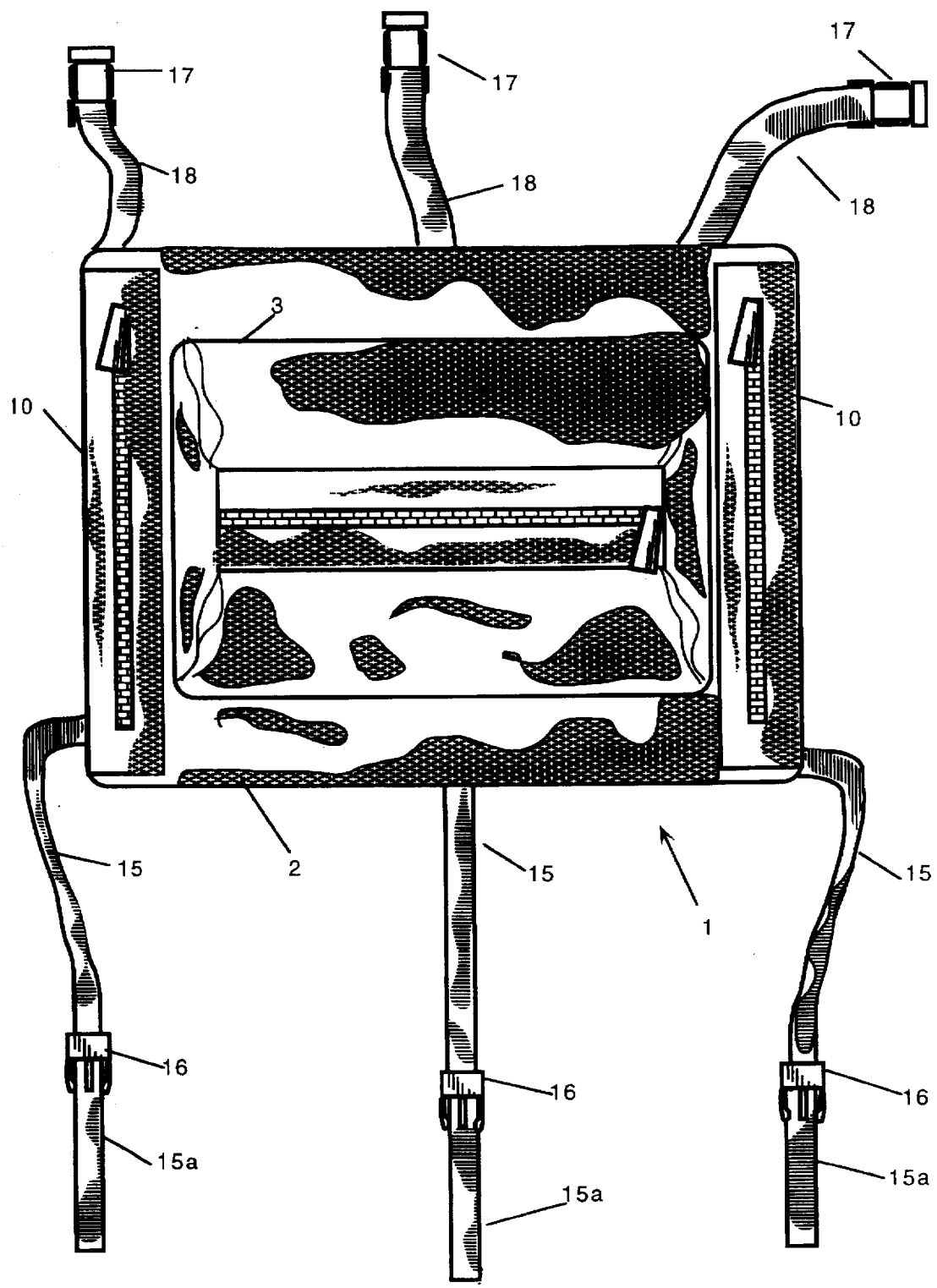
FIG. 1 is a top view of my invention without a gas can installed.

Referring now to FIG. 1, my new carrier 1 is shown. The carrier 1 has A generally rectangular box portion, or body 2. The body 2 has an internal recessed section 3 and an outer perimeter. The form as described is created by an inner core 40. See FIGS. 9 and 10. This core 40 is made of foam rubber in the preferred embodiment. However, any other suitable material may be used. The inner core 40 has a recessed center portion 41 that forms the internal recessed section 3. The internal core 40 is covered with a covering 43 that is made of heavy duty pack cloth or similar material.

In the preferred embodiment, the outer perimeter 4 has two side pockets 10 with zippers. Note that one or both pockets 10 can be omitted. To secure the carrier 1 to a vehicle, three straps 15 are provided. Three FASTEX types clips, also knows as side release clips, are used to secure the straps 15 to the vehicle. FASTEX clips are manufactured by FASTEX of Des Plaines, Ill. (see U.S. Pat. Nos. 4,150,464 and 4,171,555, which are incorporated herein by reference). FASTEX clips have a clip end 16 and a buckle end 17, as shown. The buckle ends 17 are secured to the body 2 with straps 18 as shown. The straps 15 are adjusted by clipping the clip ends 16 and the buckle ends 17 together and then tightening the straps 15 by pulling the strap tails 15a though the clip end 16.

Figure 7:
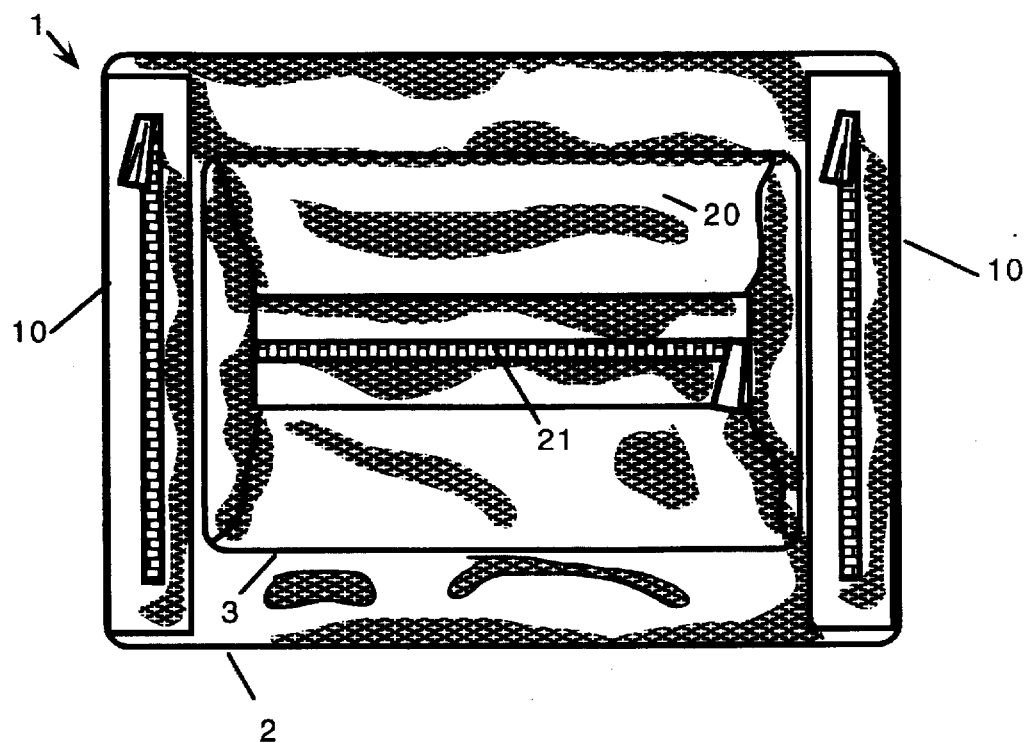
FIG. 7 is a top view of my invention without a gas can installed and the internal pocket expanded.
Figure 8:
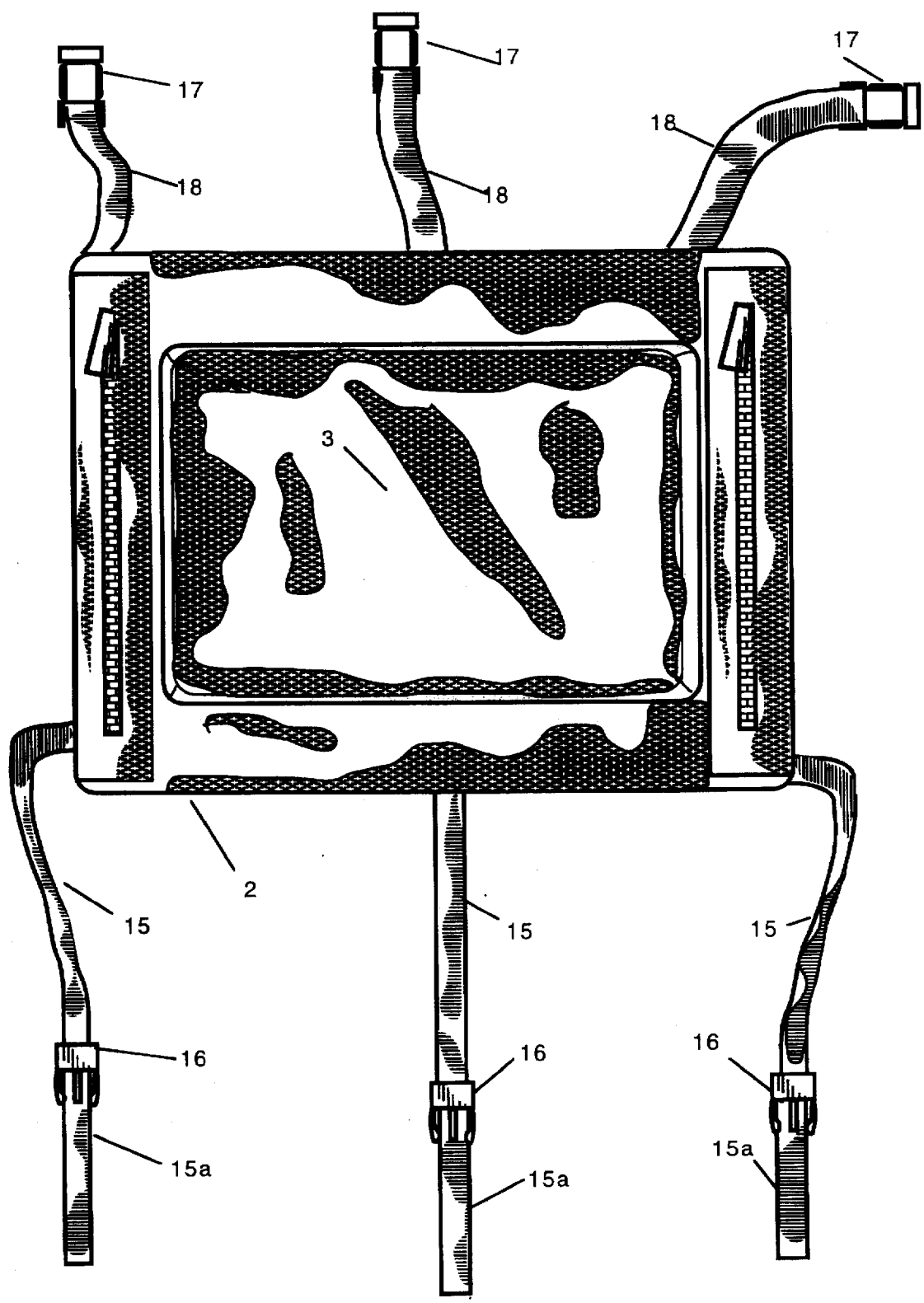
FIG. 8 is a top view a second embodiment of my invention without a gas can installed and having no internal pocket.

In the preferred embodiment, the internal recessed section 3 has an expandable pocket 20 attached to the perimeter 4. This pocket 20 has a zipper closure 21 as shown. The pocket can be pushed down into the recessed portion 3 when carrying a gas can 100 or other large object in the carrier 1. See, e.g., FIG. 5. When not carrying a gas can, the pocket 20 can be pulled up out of the recess 3 and used to hold various items. See FIGS. 6 and 7. FIG. 8 shows an embodiment that has no internal pocket in the internal recess 3. In this embodiment, a gas can 100 or other items can be carried in the internal recess 3, but these items can not be protected without another cover.

Figure 2:
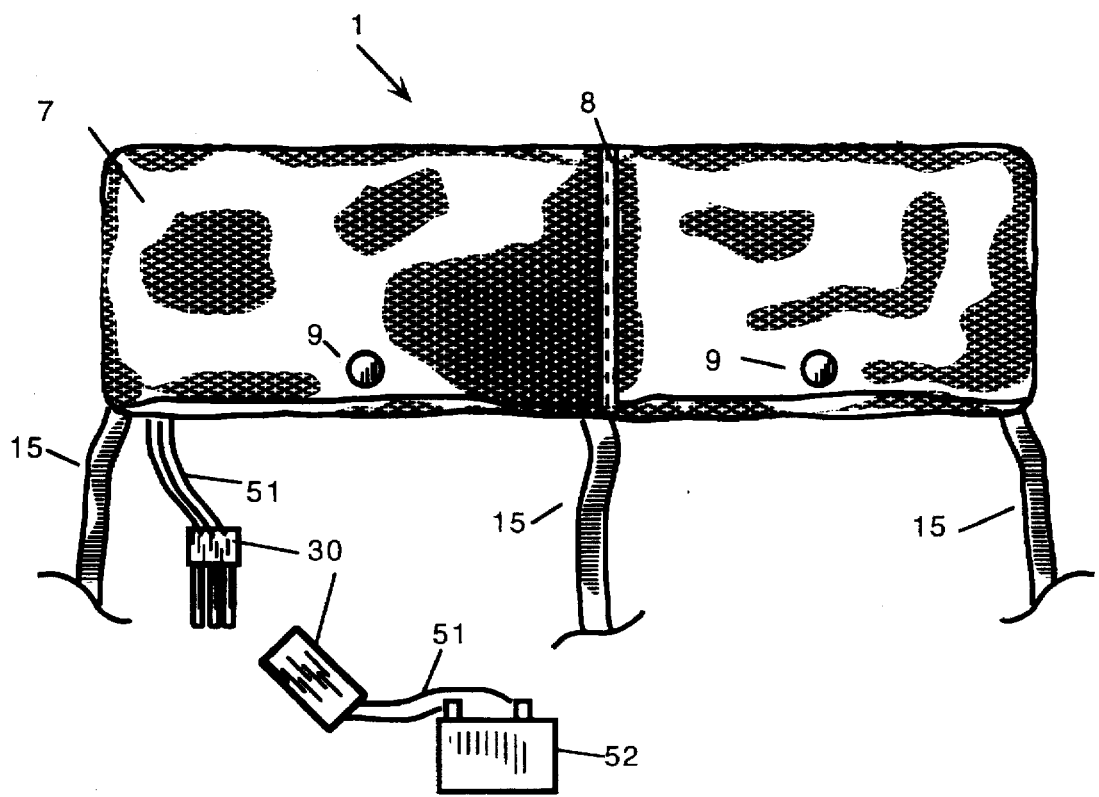
FIG. 2 is a front view of my invention with no gas can installed and the internal pocket collapsed.

FIG. 2 shows the front of the carrier 1. Here, a front panel 7 is shown. This panel 7 can be divided by a row of stitches 8 if desired. Two snaps 9 are used to close the front panel 7 closed. The front panel 7 is designed to open so that the inner foam core 40 (see FIG. 9) can be inserted and removed. Note also that in this view an optional lighting connector 30 is shown. This connector 30 is used to connect a rear light 50 (discussed below) to the vehicle's electrical system.

Figure 3:
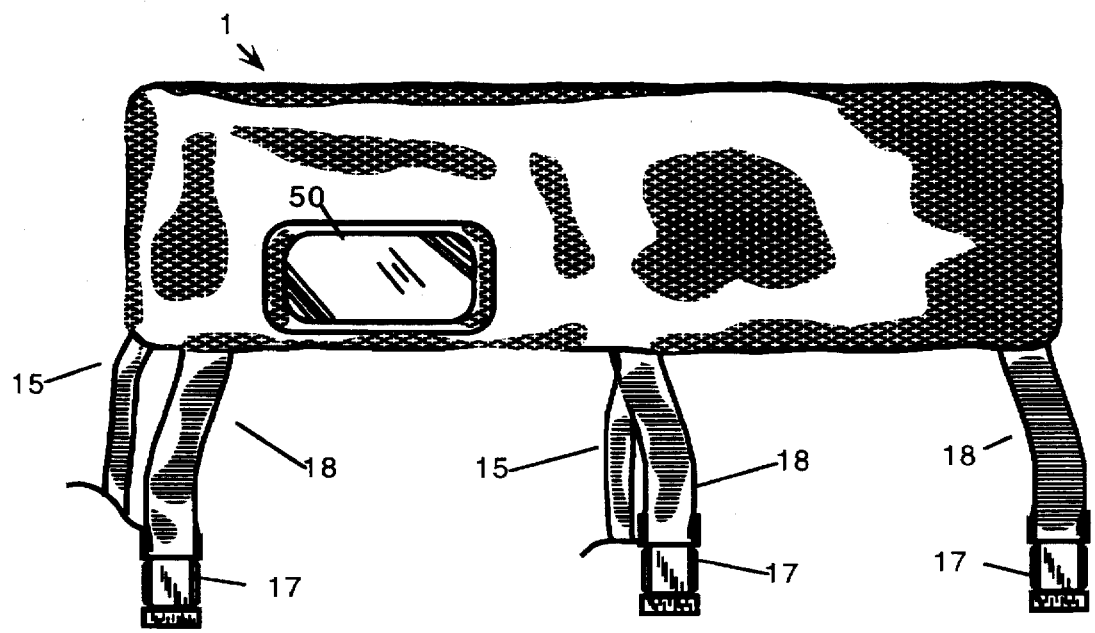
FIG. 3 is a rear view of my invention with no gas can installed and the internal pocket collapsed.

FIG. 3 is a rear view of the carrier 1. Here, the body 2 is covered as before. A rear light 50 is provided as an option.

In the preferred embodiment, the rear light 50 is used to supplement the vehicle's rear light if the carrier 1 covers the vehicle's light when it is installed. An electrical cord 51 is used to connect the rear light 50, through connector 30 to a source of electric power 52, typically, a vehicle battery.

Figure 4:
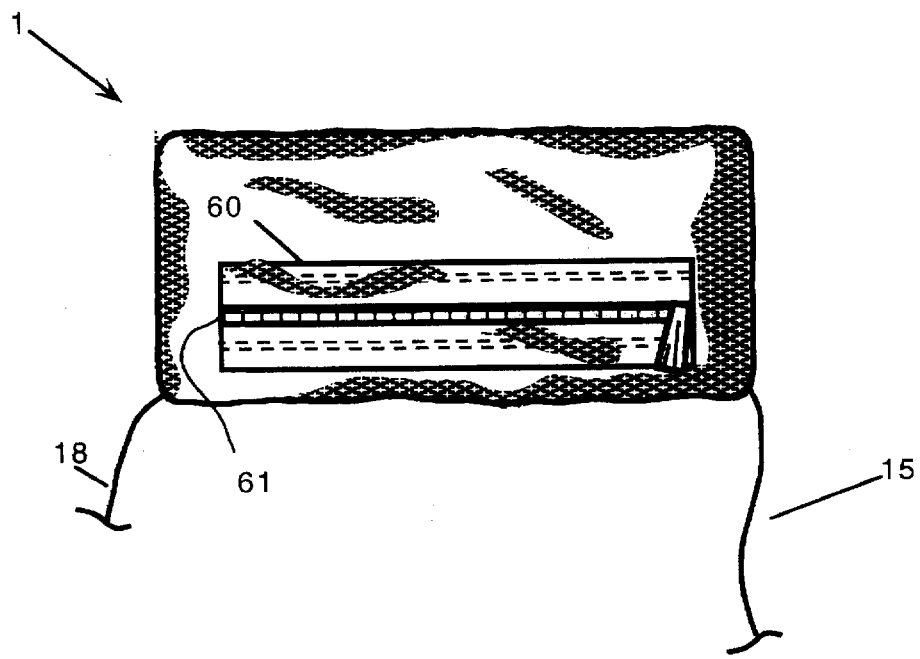
FIG. 4 is a side view of the invention.

FIG. 4 is a side view of the carrier 1. Here, an optional side pocket 60 is shown. This pocket is closed by a zipper 61 or similar fastener.

Figure 5:
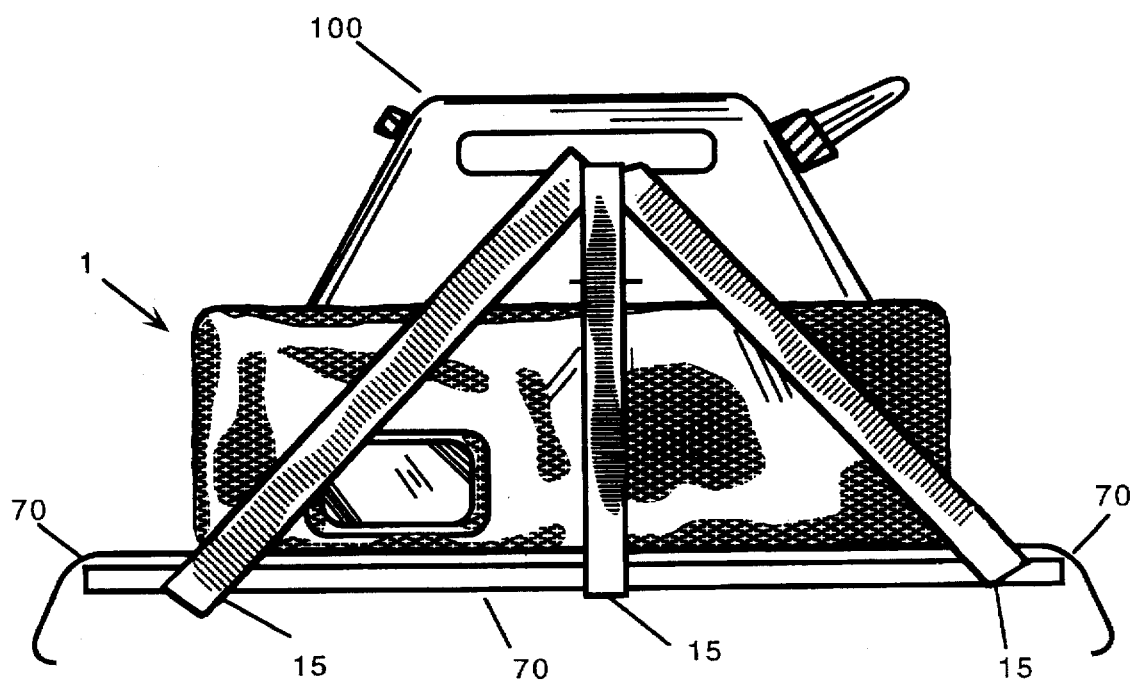
FIG. 5 is a rear view of my invention with a gas can installed and the invention strapped to a snow mobile body.
Figure 11:
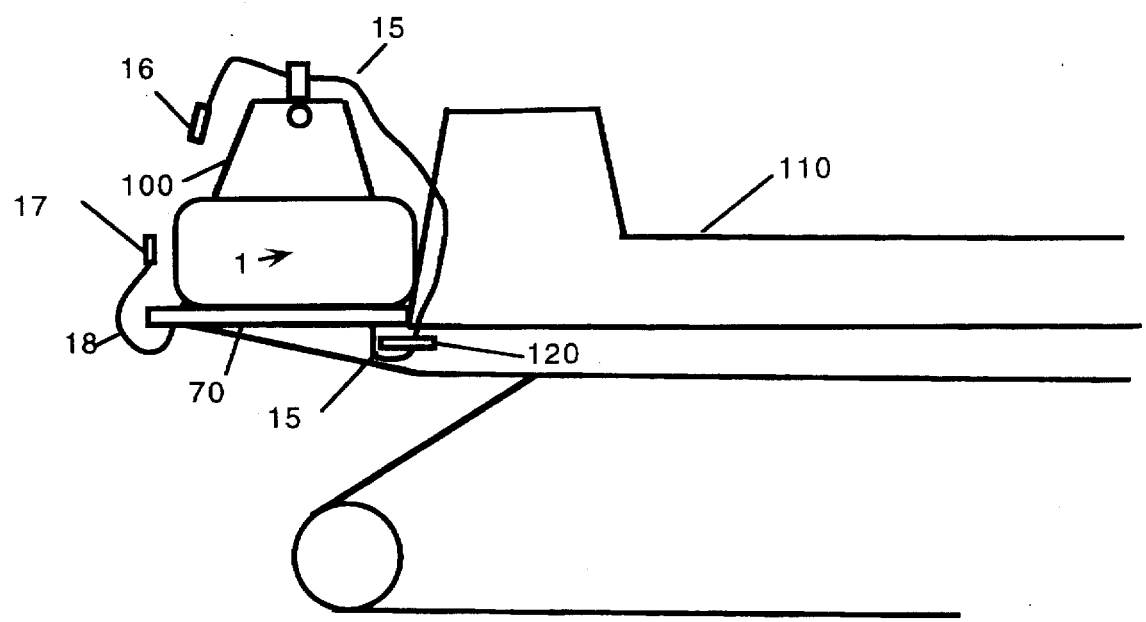
FIG. 11 shows the details of the "U" bolt system for securing the straps to the vehicle.

FIG. 5 is a rear view of the invention with a gas can 100 in place and the straps 15 in position. Note that the straps 15 pass over and around a support bar 70 that is placed on the vehicle. The gas can sits in the inner recess 3 of the carrier 1. FIG. 11 shows a detail of a "U" bolt system that is attached to the vehicle as needed, to secure the outer straps 15. This system is discussed in more detail below.

Figure 6:
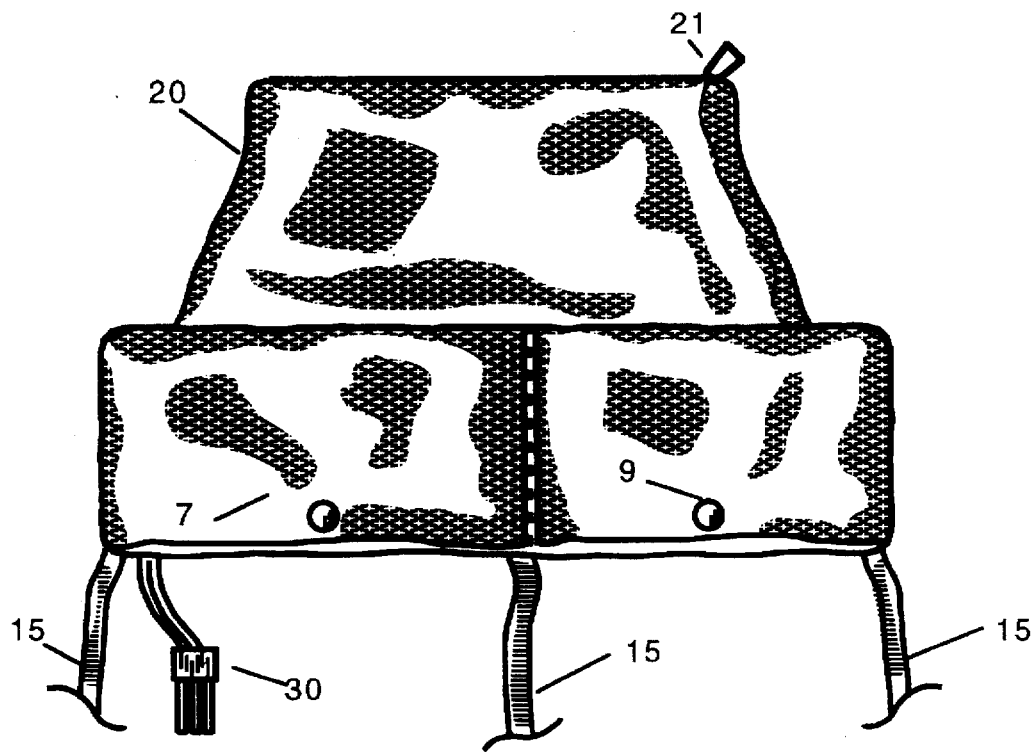
FIG. 6 is a front view of my invention with no gas can installed and the internal pocket expanded.

FIG. 6 is a front view of the carrier 1 with the expandable pocket 20 in use. Here, equipment or clothing is stored within the carrier 1 and is protected by the expandable pocket 20. The pocket is designed to be flexible so that the equipment and gear within the pocket can be compressed by the straps 15. FIG. 7 is a top view of the expandable pocket 20 in the expanded mode.

FIG. 8 is a top view of the second embodiment of the carrier 1 here, the expandable pocket 20 is eliminated and the inner recessed portion 3 is covered with pack cloth. This forms an open container structure that has no expandable pocket.

Figure 9:
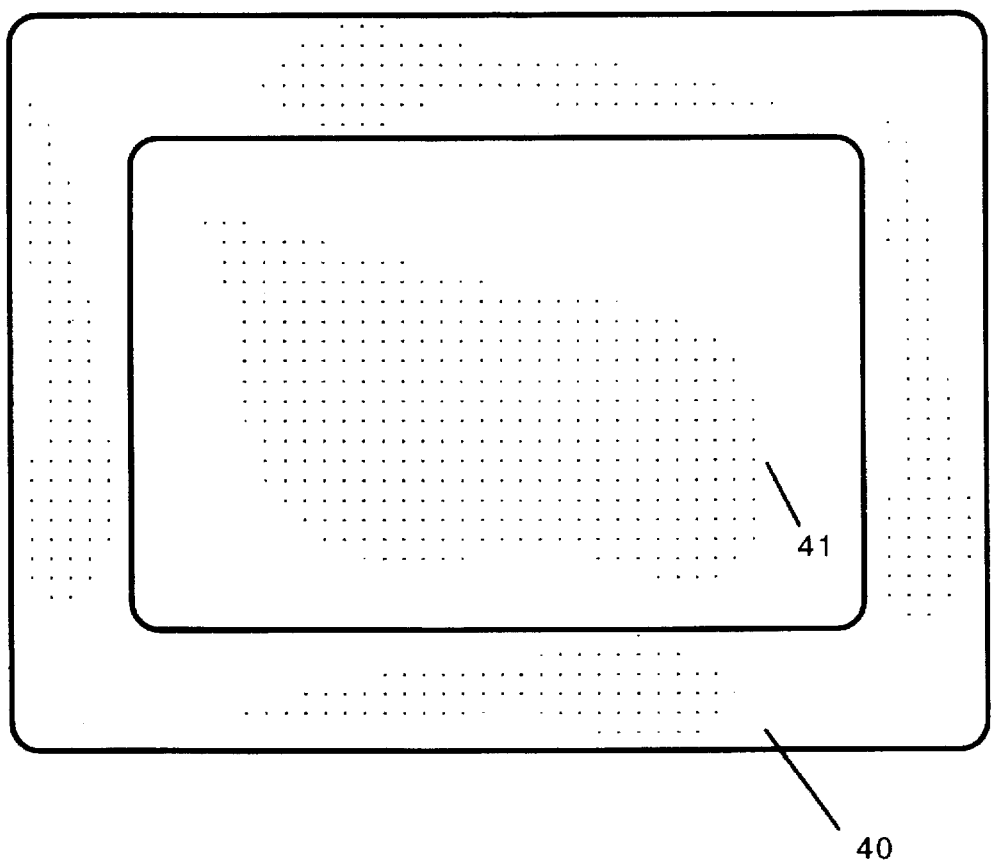
FIG. 9 is a top view of the foam core.

FIG. 9 is a top view of the inner foam core. This core is a simple rectangular piece of foam that has the inner recess cut out of the center.

Figure 10:
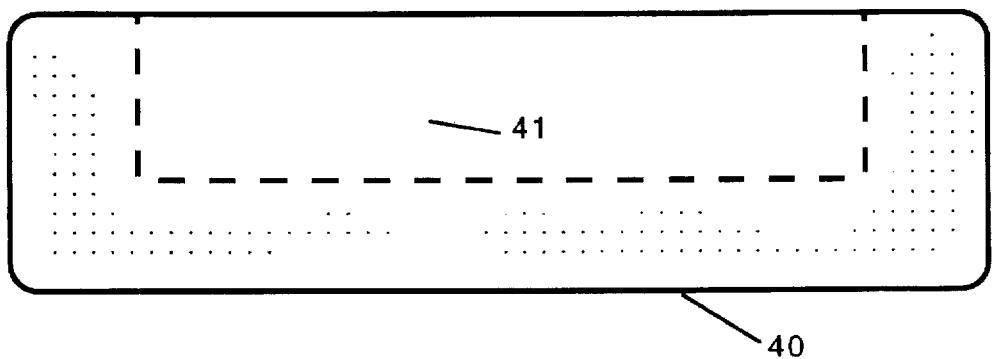
FIG. 10 is a side view of the foam core.

FIG. 10 is a side view of the foam core. This view shows the depth of the inner recess.

FIG. 11 shows the details of the "U" bolt system for securing the straps 15 to the vehicle. As noted above, the straps 18 fit over the back rail 70 of the vehicle. Often, there is not any way to secure the front straps 15 to the vehicle. FIG. 11 shows how U bolts 120 can be attached to the front saddle portion 110 of a snow machine. The U Bolts are installed in holes drilled through the rear portion of the snowmachine track tunnel. The U Bolts 120 are then secured by washers and nuts (not shown). FIG. 11 shows how the straps 15 are placed through the U Bolts 120. Note that FIG. 11 shows the right side of the snow machine. A U bolt 120 is installed on the left side of the snow machine in an identical manner.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A gas can carrier for an off-road vehicle comprising:
    a) a generally rectangular box portion, said generally rectangular box portion having an inner recess formed therein to receive articles, and also having an expandable pocket portion, formed within said inner recess, whereby when a gas can in placed within said inner recess, said expandable pocket portion is collapsed within said inner recess, and when said gas can is not in place, said expandable pocket portion can be expanded as desired, to hold other equipment and supplies;
    b) a means for protecting said generally rectangular box portion, said means for protecting said generally rectangular box portion having at least one storage pocket formed therein; and
    c) means for retaining said gas can carrier on an off-road vehicle.

2. The gas can carrier of claim 1 wherein the means for retaining said gas can carrier comprise a plurality of adjustable straps.

3. The gas can carrier of claim 1 wherein a gas can is carried within the inner recess of said generally rectangular box portion.

4. The gas can carrier of claim 3 wherein the gas can is held in place within the gas can carrier by at least one adjustable strap.

5. The gas can carrier of claim 1 wherein said generally rectangular box portion is made of foam rubber.

6. The gas can carrier of claim 1 further comprising a rear tail light, installed on said gas can carrier; and a means for operating said rear tail light in electrically operable communication with said off-road vehicle.

7. A gas can carrier for an off-road vehicle comprising:
    a) a generally rectangular box portion, said generally rectangular box portion having an inner recess formed therein to receive articles, wherein said rectangular box portion also has an expandable pocket portion, formed within said inner recess, whereby when a gas can in placed within said inner recess, said expandable pocket portion is collapsed within said inner recess, and when said gas can is not in place, said expandable pocket portion can be expanded as desired, to hold other equipment and supplies;
    b) a cover for protecting said generally rectangular box portion, said cover having a pair of storage pockets formed therein, each storage pocket being oppositely disposed about said inner recess;
    c) a plurality of adjustable straps, adjustably attached to said gas can carrier; and
    d) a means for securing said plurality of straps to said off-road vehicle.

8. The gas can carrier of claim 7 wherein a gas can is carried within the inner recess of said generally rectangular box portion.

9. The gas can carrier of claim 8 wherein the gas can is held in place within the gas can carrier by said plurality of adjustable straps.

10. The gas can carrier of claim 7 wherein the means for securing said plurality of straps to said off-road vehicle comprise a pair of "U" bolts, fixedly attached to said off-road vehicle.

11. The gas can carrier of claim 7 wherein said generally rectangular box portion is made of foam rubber.

12. The gas can carrier of claim 7 further comprising a rear tail light, installed on said gas can carrier; and a means for operating said rear tail light in electrically operable communication with said off-road vehicle.

13. A gas can carrier for an off road vehicle comprising:
    a) a generally rectangular box portion, said generally rectangular box portion having an inner recess formed therein to receive articles, said generally rectangular box portion also being made of foam rubber, said generally rectangular box portion further having two oppositely disposed ends, and a center;
    b) a removable cover for protecting said generally rectangular box portion, said removable cover having a pair of storage pockets formed therein, each storage pocket being oppositely disposed about said inner recess, said removable cover further having means for securing said removable cover to said generally rectangular box portion, said removable cover also having an expandable pocket portion, formed to fit within said inner recess, whereby when a gas can in placed within said inner recess, said expandable pocket portion is collapsed within said inner recess, and when said gas can is not in place, said expandable pocket portion can be expanded as desired, to hold other equipment and supplies;

c) a plurality of adjustable straps, including:
  i) a first adjustable strap, being attached to one end of said generally rectangular box portion;
  ii) a second adjustable strap, being attached to the opposite end of said generally rectangular box portion; and
  iii) a third adjustable strap being attached to the center of said generally rectangular box portion; and d) a means for securing said plurality of adjustable straps to said off-road vehicle.

14. The gas can carrier of claim 13 wherein a gas can is carried within the inner recess of said generally rectangular box portion.

15. The gas can carrier of claim 14 wherein the gas can is held in place within the gas can carrier by the plurality of adjustable straps.

16. The gas can carrier of claim 13 wherein the means for securing said plurality of straps to said off-road vehicle comprise a pair of "U" bolts, fixedly attached to said off-road vehicle.

17. The gas can carrier of claim 13 further comprising a rear tail light, installed on said gas can carrier; and a means for operating said rear tail light in electrically operable communication with said off-road vehicle.

* * * * *